(12) United States Patent
Pentikäinen

(10) Patent No.: US 10,789,730 B2
(45) Date of Patent: Sep. 29, 2020

(54) METHOD AND APPARATUS FOR MONITORING A POSITION

(71) Applicant: Teknologian Tutkimuskeskus VTT Oy, Espoo (FI)

(72) Inventor: Vesa Pentikäinen, VTT (FI)

(73) Assignee: Teknologian Tutkimuskeskus VTT Oy, Espoo (FI)

( * ) Notice: Subject to any disclaimer, the term of this patent is extended or adjusted under 35 U.S.C. 154(b) by 271 days.

(21) Appl. No.: 16/085,063

(22) PCT Filed: Mar. 16, 2017

(86) PCT No.: PCT/FI2017/050175
§ 371 (c)(1),
(2) Date: Sep. 14, 2018

(87) PCT Pub. No.: WO2017/158240
PCT Pub. Date: Sep. 21, 2017

(65) Prior Publication Data
US 2019/0080473 A1 Mar. 14, 2019

(30) Foreign Application Priority Data

Mar. 18, 2016 (FI) .................................. 20165224

(51) Int. Cl.
*G01B 11/25* (2006.01)
*G06T 7/73* (2017.01)
(Continued)

(52) U.S. Cl.
CPC .............. *G06T 7/74* (2017.01); *G01B 11/167* (2013.01); *G01B 11/2522* (2013.01);
(Continued)

(58) Field of Classification Search
CPC ......... G06T 7/74; G01S 17/931; G01S 17/42; G01S 17/46; G01S 7/4808; G05D 1/0246; G01B 11/167; G01B 11/2522
See application file for complete search history.

(56) References Cited

U.S. PATENT DOCUMENTS 4,566,763 A 1/1986 Greguss
6,781,676 B2 * 8/2004 Wallace .................. G01C 3/08
250/221

(Continued)

FOREIGN PATENT DOCUMENTS

| CN | 104408732 A | 3/2015 |
|---|---|---|
| EP | 2631730 A1 | 8/2013 |
| WO | 2012038601 A1 | 3/2012 |

OTHER PUBLICATIONS

Vu, Anh, and Matthew Barth. "Catadioptric omnidirectional vision sensor integration for vehicle-based sensing." In 2009 12th International IEEE Conference on Intelligent Transportation Systems, pp. 1-7. IEEE, 2009. (Year: 2009).*

(Continued)

*Primary Examiner* — Carol Wang
(74) *Attorney, Agent, or Firm* — Ziegler IP Law Group, LLC

(57) ABSTRACT

A method for determining the position of an object includes:
using a projector to project a marker pattern to a projection zone such that a first marker feature of the marker pattern is projected on a first surface portion,
using a camera to capture an image of a viewing zone which at least partly overlaps the projection zone, and
determining the position of said first surface portion by analyzing the captured image, (Continued)

wherein the viewing zone surrounds the camera, and the image of the viewing zone is captured by forming an annular image of the viewing zone on an image sensor.

18 Claims, 11 Drawing Sheets

(51) Int. Cl.
*G01S 17/42* (2006.01)
*G01S 17/46* (2006.01)
*G05D 1/02* (2020.01)
*G01S 7/48* (2006.01)
*G01S 17/931* (2020.01)
*G01B 11/16* (2006.01)

(52) U.S. Cl.
CPC ............ *G01S 7/4808* (2013.01); *G01S 17/42* (2013.01); *G01S 17/46* (2013.01); *G01S 17/931* (2020.01); *G05D 1/0246* (2013.01)

(56) References Cited

U.S. PATENT DOCUMENTS

| | | | | |
|---|---|---|---|---|
| 7,116,246 | B2* | 10/2006 | Winter | G08G 1/14 340/932.2 |
| 7,433,024 | B2* | 10/2008 | Garcia | G01B 11/2545 356/4.01 |
| 10,571,668 | B2* | 2/2020 | Braker | G03B 37/06 |
| 2010/0265316 | A1 | 10/2010 | Sali et al. | |
| 2013/0002823 | A1 | 1/2013 | Lim et al. | |
| 2015/0362921 | A1 | 12/2015 | Hanaoka et al. | |

OTHER PUBLICATIONS

Jia et al, "3D depth information extraction with omni-directional camera" Information Processing Letters 115 (2015) 285-291, www.elsevier.com/locate/ipl, Available online Oct. 17, 2014, http://dx.doi.org/10.1016/j.ipl.2014.09.029, 7 pages.

Jia et al. "Depth Measurement by Omni-directional Camera" Proceedings of the 2013 IEEE International Conference on Technology in Automation Control and Intelligent Systems May 26-29, 2013, Nanjing, China, 4 pages.

Birch et al. "Depth measurements through controlled aberrations of projected patterns." revised Feb. 9, 2012; accepted Feb. 28, 2012; published Mar. 6, 2012, Mar. 12, 2012 / vol. 20, No. 6 / Optics Express 6561, 14 pages.

Gong et al. "Design of a novel panoramic lens without central blindness" 2015 International Conference on Optical Instruments and Technology: Optical Systems and Modern Optoelectronic Instruments, Proc. of SPIE vol. 961816, CCC code: 0277-786X doi: 10.1117/12.2194061, 12 pages.

Ukida et al "Omni-directional 3D Measurement by Hyperbolic Mirror Cameras and Pattern Projection." I2MTC 2008—IEEE International Instrumentation and Measurement Technology Conference Victoria, Vancouver Island, Canada, May 12-15, 2008, 6 pages.

International Search Report, Application No. PCT/FI2017/050175, dated Jun. 20, 2017, 5 pages.

Written Opinion of the International Searching Authority, Application No. PCT/FI2017/050175, dated Jun. 20, 2017, 9 pages.

Finnish Patent and Registration Office, Office Action, Application No. FI20165224, dated Sep. 20, 2016, 10 pages.

* cited by examiner

METHOD AND APPARATUS FOR MONITORING A POSITION

FIELD

The aspects of the disclosed embodiments relates to monitoring positions of objects.

BACKGROUND

A monitoring device may be arranged to provide information about the positions of objects located near said monitoring device.

The information may be used e.g. for controlling operation of an autonomous vehicle. The control system of an autonomous vehicle may use real time information about positions of the objects e.g. in order to control the velocity and/or direction of the vehicle.

It is known that information about the positions of the objects may be obtained e.g. by using a rotating laser scanner.

SUMMARY

Some versions may relate to measuring the position of an object. Some versions may relate to measuring the position of a vehicle. Some versions may relate to a position monitoring device. Some versions may relate to a vehicle, which comprises a position monitoring device.

According to an aspect, there is provided a method, comprising:
  using a projector (PU1) to project a marker pattern (PAT1) to a projection zone (ZONE1) such that a first marker feature ($DOT1_k$) of the marker pattern (PAT1) is projected on a first surface portion (R1a),
  using a camera (CAM1) to capture an image (IMG2) of a viewing zone (ZONE2) which at least partly overlaps the projection zone (ZONE1), and
  determining the position ($L_k$) of said first surface portion (R1a) by analyzing the captured image (IMG2),
wherein the viewing zone (ZONE2) surrounds the camera (CAM1), and the image (IMG2) of the viewing zone (ZONE2) is captured by forming an annular image of the viewing zone (ZONE2) on an image sensor (DET1).

According to an aspect, there is provided a device, comprising:
  a projector (PU1) to project a marker pattern (PAT1) to a projection zone (ZONE1) such that a first marker feature ($DOT1_k$) of the marker pattern (PAT1) is projected on a first surface portion (R1a),
  a camera (CAM1) to capture an image (IMG2) of a viewing zone (ZONE2) which at least partly overlaps the projection zone (ZONE1), and
  a processing unit (CNT1) to determine the position ($L_k$) of said first surface portion (R1a) by analyzing the captured image (IMG2),
wherein the viewing zone (ZONE2) surrounds the camera (CAM1), and the camera (CAM1) is arranged to capture the image (IMG2) of the viewing zone (ZONE2) by forming an annular image of the viewing zone (ZONE2) on an image sensor (DET1).

According to an aspect, there is provided a vehicle, which comprises the position monitoring device.

The monitoring device may have a 360° horizontal view around the vertical axis. The monitoring device may provide position information by measuring the positions of objects. The monitoring device may provide position information e.g. for controlling operation of a vehicle. The information may be used e.g. for controlling the velocity and/or direction of the vehicle.

The projection zone and the viewing zone may together define a monitoring zone. The monitoring zone may completely surround the monitoring device. The monitoring zone may correspond to a 360° horizontal view around the vertical axis. The monitoring device may measure distances to objects which are within the monitoring zone. The monitoring device may measure distances to multiple objects by analyzing a single captured image. The objects may be located at arbitrary positions around the monitoring device. The monitoring device does not need to comprise any moving parts. In particular, the monitoring device does not need to comprise a rotating mirror.

In an embodiment, the distance information may be determined from a radial displacement of a feature appearing in the annular image. The distance information may be determined fast by comparing the annular image with a reference image.

In an embodiment, the distance information may be determined from geometric distortion of a feature appearing in the annular image. The distance information may be determined fast by analyzing the annular image.

BRIEF DESCRIPTION OF THE DRAWINGS

In the following examples, several variations will be described in more detail with reference to the appended drawings, in which.

DETAILED DESCRIPTION

Figure 1:
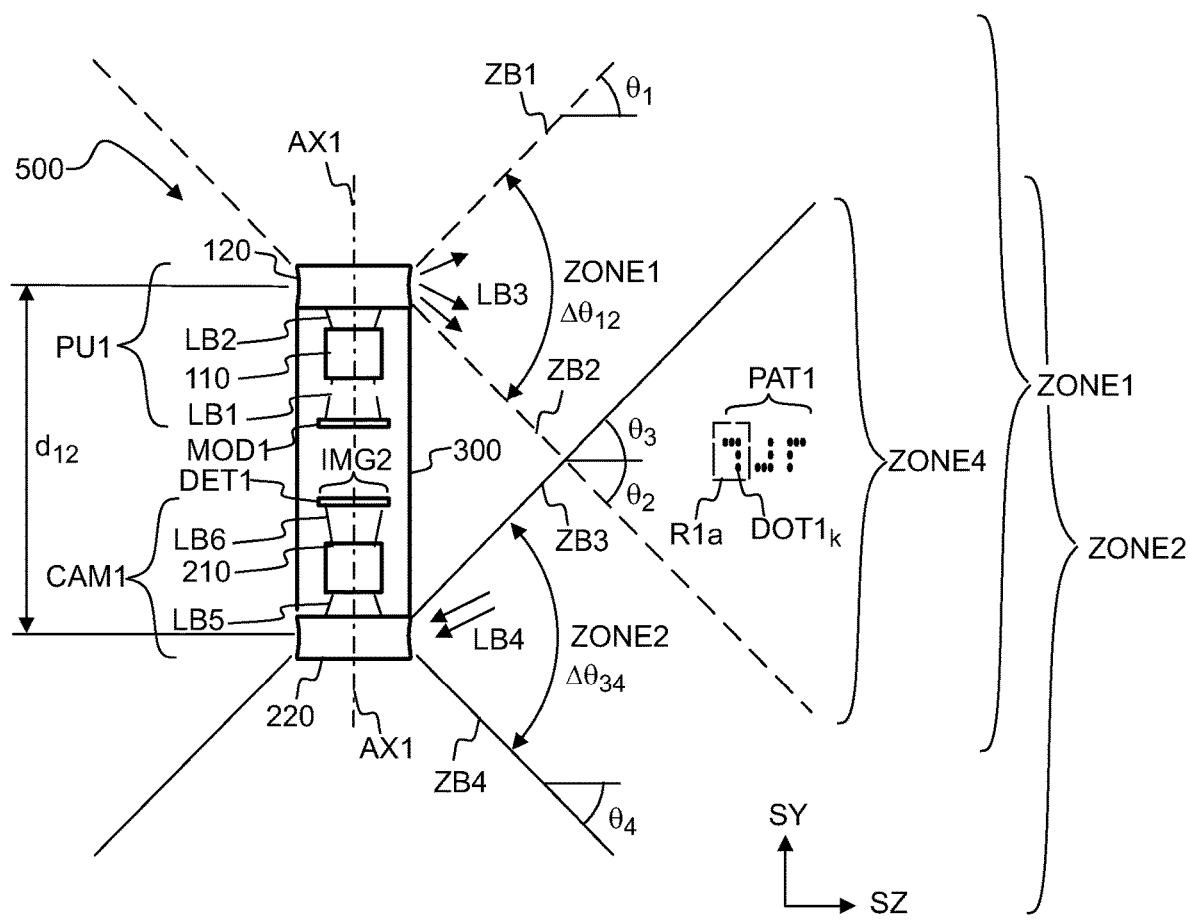
FIG. 1 shows, by way of example, in a cross-sectional side view, a distance monitoring device.

Referring to FIG. 1, the distance monitoring device 500 may comprise a projector PU1 and a camera CAM1. The projector PU1 may be arranged to project a plurality of marker features $DOT1_k$, $DOT1_{k+1}$ on objects located in the environment ENV1 of the device 500. The marker features may be e.g. dots or line sections (see FIGS. 2a and 2b). The projector PU1 may be arranged to project a marker pattern PAT1 to a projection zone ZONE1. The marker pattern PAT1 may comprise a plurality of marker features. The marker pattern PAT1 may comprise e.g. a plurality of dots, lines, and/or line sections. The projector PU1 may provide light LB3. The projected light LB3 may form one or more marker feature on a surface when the light LB3 impinges on said surface.

The camera CAM1 may be arranged to receive light from a viewing zone ZONE2. The camera CAM1 may be arranged to capture an annular image IMG2, which comprises images of the projected marker features. The positions of the objects may be determined by analyzing the annular image IMG2. The camera CAM1 may be arranged to form the annular image IMG2 on an image sensor DET1.

The projector PU1 may comprise an optical output element 120. The output element 120 may be e.g. a catadioptric lens, which may be arranged to project light LB3 to a projection zone ZONE1. The projected light LB3 may form the marker features when the light LB3 impinges on a surface. The output element 120 may be axially symmetric with respect to an axis AX1. The axis AX1 may be e.g. a substantially a vertical axis. The projection zone ZONE1 may completely surround the axis AX1. The projector PU1 may comprise a spatial modulator MOD1 to provide a primary image IMG0. The projector PU1 may form the marker pattern PAT1 by focusing light LB1 of the primary image IMG0 into the projection zone ZONE1. The projector PU1 may comprise e.g. the modulator MOD1, focusing optics 110, and the output element 120 to project the marker pattern PAT1 to the projection zone ZONE1. The focusing optics 110 may provide a focused light beam LB2. The output element 120 may provide the light LB3 by deflecting light of the focused light beam LB2 to the projection zone ZONE1.

The camera CAM1 may comprise an optical input element 220. The input element 220 may be e.g. catadioptric lens, which is arranged to receive light from a viewing zone ZONE2. The input element 220 may be axially symmetric with respect to the axis AX1. The viewing zone ZONE2 may completely surround the axis AX1. The input element 220 may provide a deflected beam LB5 by deflecting light LB4 received from the viewing zone ZONE2. The focusing optics 210 may provide a focused light beam LB6 by focusing light of the deflected beam LB5. The focused light beam LB6 may impinge on an image sensor DET1 so as to form an annular image IMG2. The camera CAM1 may be arranged to form the annular image IMG2 of the viewing zone ZONE2 on the image sensor DET1. The camera CAM1 may comprise the input element 220 and the focusing optics 210 to form the annular image IMG2 of the viewing zone ZONE2 on an image sensor DET1. The camera CAM1 may be arranged to capture the annular image IMG2 of the viewing zone ZONE2. The camera CAM1 may be arranged to convert the annular optical image IMG2 into a digital image.

The viewing zone ZONE2 overlaps the projection zone ZONE1. The overlapping part of the viewing zone ZONE2 may be called as the monitoring zone ZONE4. The projection zone ZONE1 and the viewing zone ZONE2 may together define the monitoring zone ZONE4 of the device 500. The camera CAM1 may detect a marker feature, which is projected on a surface, which is located in the monitoring zone ZONE4. The device 500 may measure the distances to objects which are located within the monitoring zone ZONE4.

The dimension $d_{12}$ denotes the distance between the output element 120 and the input element 220. The camera CAM1 may be mechanically attached to the projector PU1 e.g. by a supporting structure 300. The supporting structure 300 may be e.g. a metal tube or a plastic tube.

The projection zone ZONE1 may have an upper conical boundary ZB1 and a lower conical boundary ZB2. $\theta_1$ may denote the angle between the upper boundary ZB1 and a horizontal plane. $\theta_2$ may denote the angle between the lower boundary ZB2 and a horizontal plane. The angle $\Delta\theta_{12}$ denotes the difference between the angles $\theta_1$ and $\theta_2$. The angle $\theta_1$ may be e.g. in the range of 10° to 60°. The angle $\theta_2$ may be e.g. in the range of −30° to 0°. The angle $\Delta\theta_{12}$ may be e.g. in the range of 10° to 60°.

The viewing zone ZONE2 may have an upper conical boundary ZB3 and a lower conical boundary ZB4. $\theta_3$ may denote the angle between the upper boundary ZB3 and a horizontal plane. $\theta_4$ may denote the angle between the lower boundary ZB4 and a horizontal plane. The angle $\Delta\theta_{34}$ denotes the difference between the angles $\theta_3$ and $\theta_4$. The angle $\theta_3$ may be e.g. in the range of 10° to 60°. The angle $\theta_4$ may be e.g. in the range of −30° to 0°. The angle $\Delta\theta_{34}$ may be e.g. in the range of 10° to 60°. The angle $\theta_{34}$ may be called e.g. as the vertical field of view. The horizontal field of view of the camera CAM1 may be e.g. substantially equal to 360°.

The projector PU1 may have an optical output element 120, the camera may have an optical input element 220, the output element 120 and the input element 220 may be located on a first (common) axis AX1, the distance $d_{12}$ between the input element 220 and the output element 120 may be greater than zero, the projection zone ZONE1 may surround the first axis AX1, and the viewing zone ZONE2 may surround the first axis AX1.

SX, SY, and SZ denote orthogonal directions. The direction SZ is parallel to the axis AX1. The horizontal plane is defined by the directions SX and SY. The horizontal plane is perpendicular to the direction SZ. The vertical direction SZ may be parallel to the direction of gravity, but the direction SZ does not need to be parallel to the direction of gravity.

The position of a surface portion of an object may be determined by a method, which comprises:

using the projector PU1 to project a marker pattern PAT1 to a projection zone ZONE1 such that a first marker feature $DOT1_k$ of the marker pattern PAT1 is projected on a first surface portion R1a, using the camera CAM1 to capture an image IMG2 of a viewing zone ZONE2 which at least partly overlaps the projection zone ZONE1, and determining the position $L_k$ of said first surface portion R1a by analyzing the captured image IMG2, wherein the viewing zone ZONE2 surrounds the camera CAM1, and the image IMG2 of the viewing zone ZONE2 is captured by forming an annular image IMG2 of the viewing zone ZONE2 on an image sensor DET1.

Figure 2A:
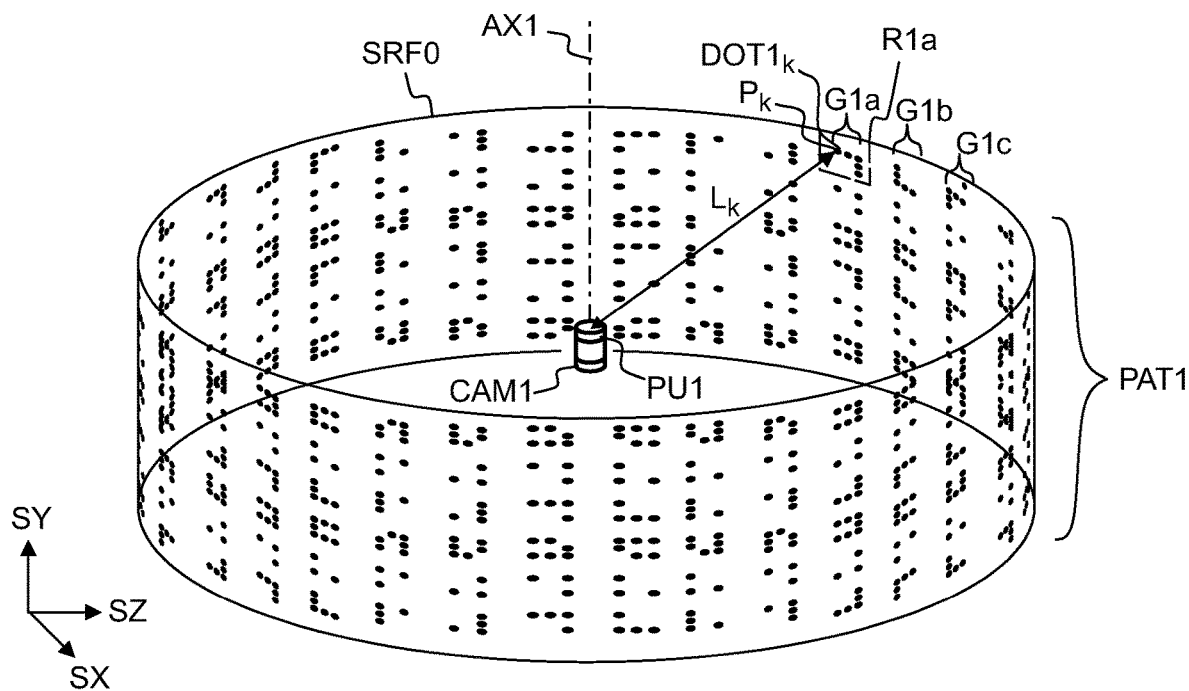
FIG. 2a shows, by way of example, in a three dimensional view, a marker pattern of the distance monitoring device.

A marker pattern PAT1, a surface portion R1a, and a marker feature $DOT1_k$ are shown e.g. in FIG. 2a. An annular image IMG2 is shown e.g. in FIGS. 7a, 7b, 8a, and 8b.

The method may comprise determining the position $L_k$ of the surface portion R1a by comparing the captured image IMG2 with a reference image $IMG2_{REF}$. A reference image is shown e.g. in FIG. 8b.

Referring to FIG. 2a, the projector PU1 may project the marker pattern PAT1 to the projection zone ZONE1. The projector PU1 may form the marker pattern PAT1 e.g. on a cylindrical surface SRF0, in a situation where the projector PU1 is surrounded by the surface SRF0. The projector PU1 form a portion of the marker pattern PAT1 on the surface of an object in a situation where the object is located in the projection zone ZONE1.

The marker pattern PAT1 may comprise e.g. a plurality of sub-patterns G1a, G1b, G1c. Each sub-pattern may comprise one or more marker features DOT1. The marker features DOT1 may be e.g. dots and/or lines.

$L_k$ may denote the distance between the monitoring device 500 and a point $P_k$ on a surface portion, e.g. on a surface portion R1a (or on a surface portion R1b). The monitoring device 500 may project a marker feature $DOT1_k$ on the surface portion R1a (or on a surface portion R1b). The device 500 and/or an object OBJ1 may move such that marker feature $DOT1_k$ is projected on a first surface portion (e.g. R1a) during a first time period, and such that said marker feature $DOT1_k$ is projected on a second surface portion (e.g. R1b) during a second different time period. The point $P_k$ may coincide with the position of the marker feature $DOT1_k$. The monitoring device 500 may capture an image IMG2, which comprises an image of the projected marker feature $DOT1_k$. The distance $L_k$ to the marker feature $DOT1_k$ may be determined by analyzing the image IMG2.

The shape of the sub-pattern G1a may be different from the shape of the neighboring sub-pattern G1b. Each sub-pattern G1a, G1b, G1c may have a locally unique shape so that each sub-pattern G1a, G1b, G1c may be distinguished from its neighboring sub-patterns based on the shape. The shape of an adjacent second sub-pattern located above a first sub-pattern may be different from the shape of the first sub-pattern so as to allow identification. Consequently, each sub-pattern G1a, G1b, G1c may be identified based on the shape of said sub-pattern. Each sub-pattern G1a, G1b, G1c may be identified at least locally based on the shape of said sub-pattern. When using the locally unique sub-patterns, the monitoring device 500 may have improved capability to simultaneously track the positions of multiple objects.

Figure 2B:
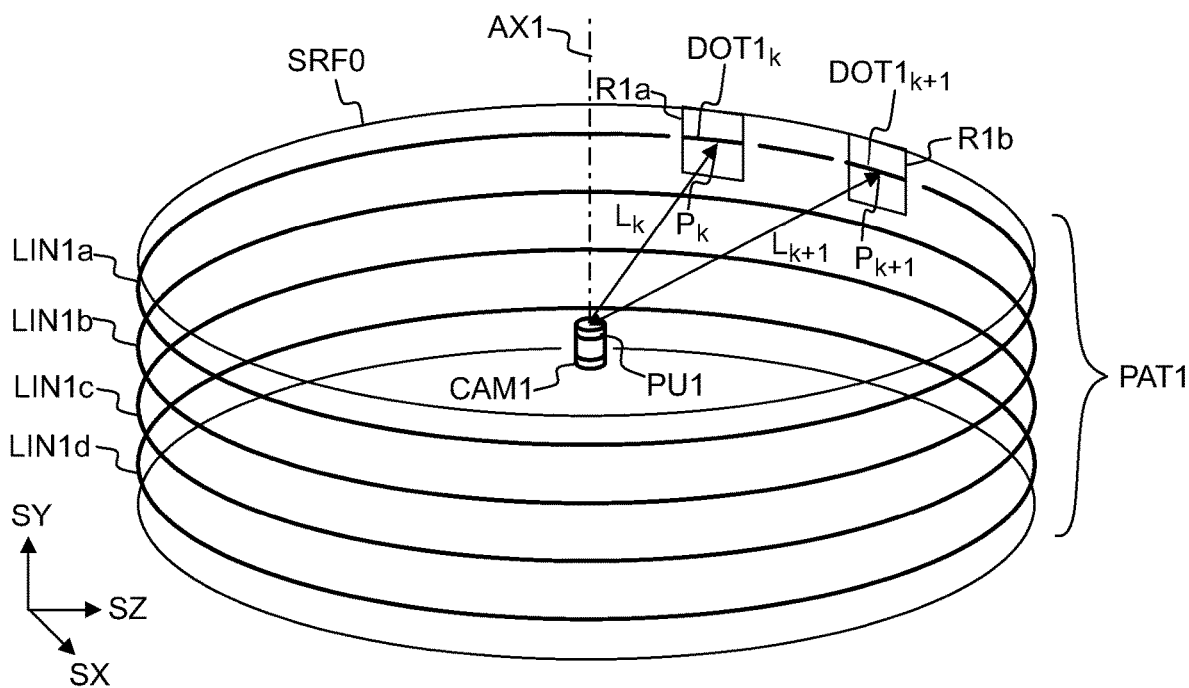
FIG. 2b shows, by way of example, in a three dimensional view, a marker pattern of the distance monitoring device.

Referring to FIG. 2b, the marker pattern PAT1 may also comprise e.g. one or more lines LIN1a, LIN1b, LIN1c, LIN1d. The device 500 may project stripe pattern to the projecting zone ZONE1. The marker features $DOT1_k$, $DOT_{k+1}$ may be e.g. substantially horizontal line sections. The lines LIN1a, LIN1b, LIN1c, LIN1d may be e.g. substantially horizontal circular lines, in a situation where the marker pattern PAT1 is projected on a cylindrical projection surface SRF0.

The monitoring device 500 may capture an image IMG2, which comprises an image of the projected marker feature $DOT1_k$. The distance $L_k$ to the marker feature $DOT1_k$ may be determined by analyzing the image IMG2. The distance to a surface portion R1a is equal to the distance $L_k$ to the marker feature $DOT1_k$ projected on said surface portion R1a. Thus, the distance $L_k$ to the marker feature $DOT1_k$ may also indicate the position of said surface portion R1a.

$L_{k+1}$ may denote the distance between the monitoring device 500 and a point $P_{k+1}$ on a surface portion, e.g. on a surface portion R1b (or on a surface portion R1a). The monitoring device 500 may project a marker feature $DOT1_{k+1}$ on the surface portion R1b. The point $P_{k+1}$ may coincide with the position of the marker feature $DOT1_{k+1}$. The monitoring device 500 may capture an image IMG2, which comprises an image of the projected marker feature $DOT1_{k+1}$. The distance $L_{k+1}$ to the marker feature $DOT1_{k+1}$ may be determined by analyzing the image IMG2.

Figure 3:
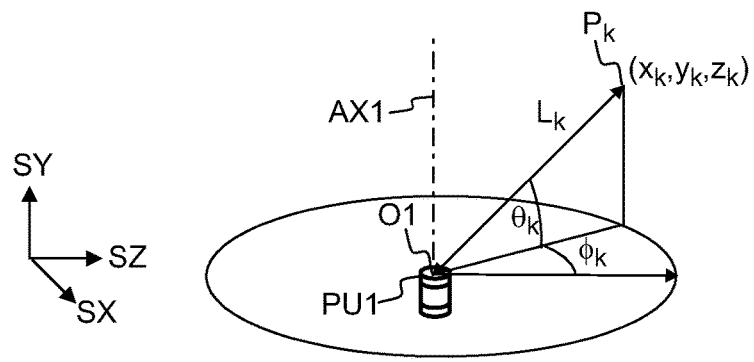
FIG. 3 shows, by way of example, in a three dimensional view, specifying the position of a point by spherical coordinates.

Referring to FIG. 3, the position of a point $P_k$ may be specified e.g. by Cartesian coordinates $(x_k, y_k, z_k)$. The position of the point $P_k$ may be specified by spherical coordinates $(\phi_k, \theta_k, L_k)$. The angle $\phi_k$ may be called e.g. as the azimuth angle. The angle $\theta_k$ may be called e.g. as the elevation angle. The distance $L_k$ may denote the distance between the point $P_k$ and an origin O1. The origin may be e.g. a predetermined point on the axis AX1. The origin O1 may be e.g. at the center of the output element 120 of the projector PU1.

Figure 4:
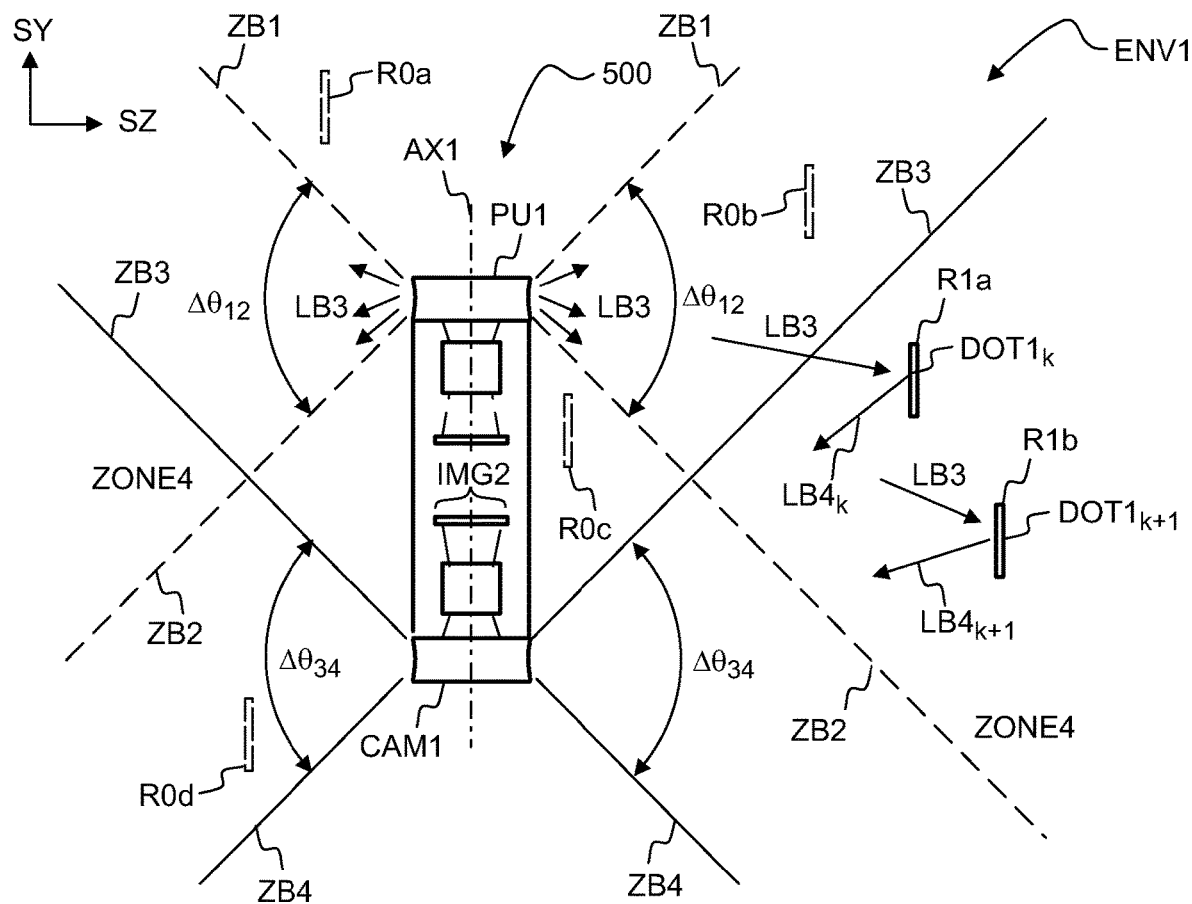
FIG. 4 shows, by way of example, in a side view, a monitoring device and a plurality of surface portions.

Referring to FIG. 4, the device 500 may operate in an environment ENV1, which comprises one or more surface portions R1a, R1b, R0a, R0b, R0c, R0d. Each surface portion may be a portion of a surface of an object. The surface portions R1a, R1b may be located in the monitoring zone ZONE4. The projecting unit PU3 may project light LB3 to the projecting zone ZONE1. A part of the light LB3 may be reflected by the surface portions to the camera CAM1. The surface portion R1a may reflect light $LB4_k$ to the camera CAM1. The surface portion R1b may reflect light $LB4_{k+1}$ to the camera CAM1. The surface portions R0a, R0b, R0c, R0d may be located outside the monitoring zone ZONE4.

Figure 5:
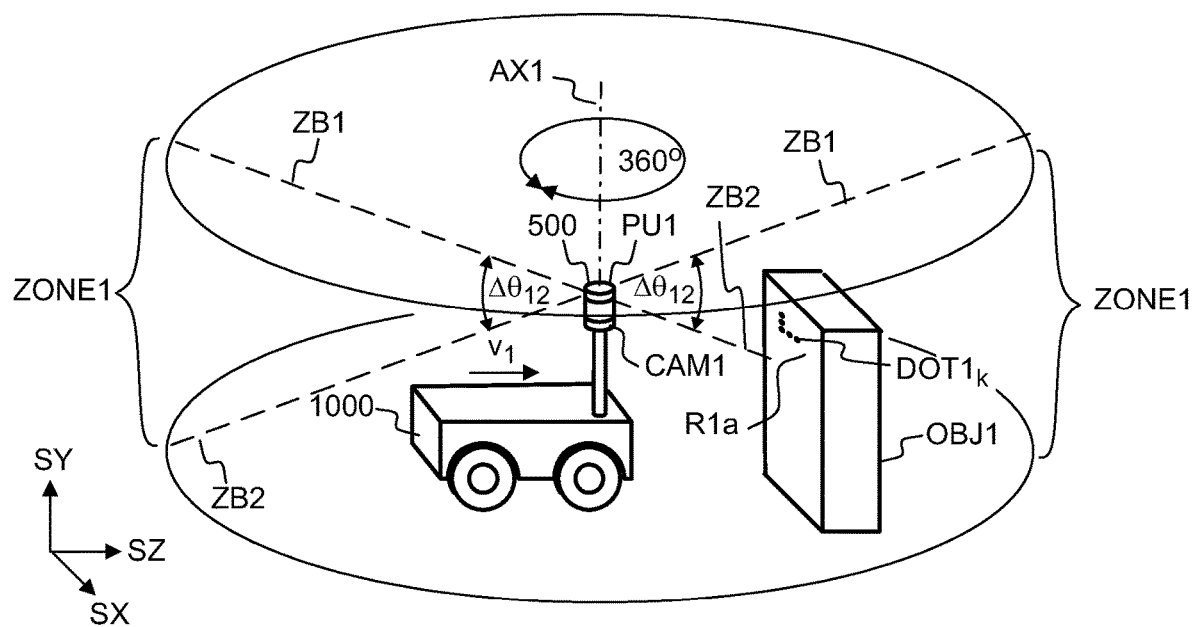
FIG. 5 shows, by way of example, in a three dimensional view, using the position monitoring device to monitor the position of an object.

Referring to FIG. 5, the positions of one or more objects OBJ1 may be measured by using the device 500. The distance between and object OBJ1 and the device 500 may be measured by using the device 500. The distance $L_k$ between the object OBJ1 and the device 500 may be monitored by using the device 500. The device 500 may be arranged measure the velocity of the object OBJ1 with respect to the device 500. The device 500 may be arranged measure the velocity of the device 500 with respect to the object OBJ1. The device 500 may be arranged to detect a change of distance between the object OBJ1 and the device 500. An object or obstacle OBJ1 may comprise a surface portion R1a and/or R1b.

The device 500 may be attached to a vehicle 1000. The vehicle may be moving at a velocity vi with respect to an obstacle OBJ1. A vehicle 1000 may comprise the device 500. The position of the vehicle 1000 may be monitored by using the device 500. The position of the vehicle 1000 with respect to one or more obstacles may be monitored by using the device 500. The velocity of the vehicle 1000 may be monitored by using the device 500. A collision between the vehicle 1000 may be avoided by using position information provided by the device 500. A route for the vehicle 1000 may be selected based on information about the positions of the obstacles. The vehicle may be e.g. a ground vehicle, an airborne vehicle, or a boat. The vehicle may be e.g. a car, a bus, a train, a motorcycle, a helicopter, or a quadrocopter.

The method may comprise determining the position (x,y) of a vehicle 1000 by determining the position $\phi_k$, $\theta_k$ $L_k$ of a first surface portion R1a of an object OBJ1.

The method may comprise determining the position (x,y) of an object OBJ1 by determining the position ($\phi_k$, $\theta_k$ $L_k$) of a surface portion R1a. The method may comprise controlling the velocity and/or direction of movement of the vehicle 1000 based on the measured position of the object OBJ1.

Figure 6A:
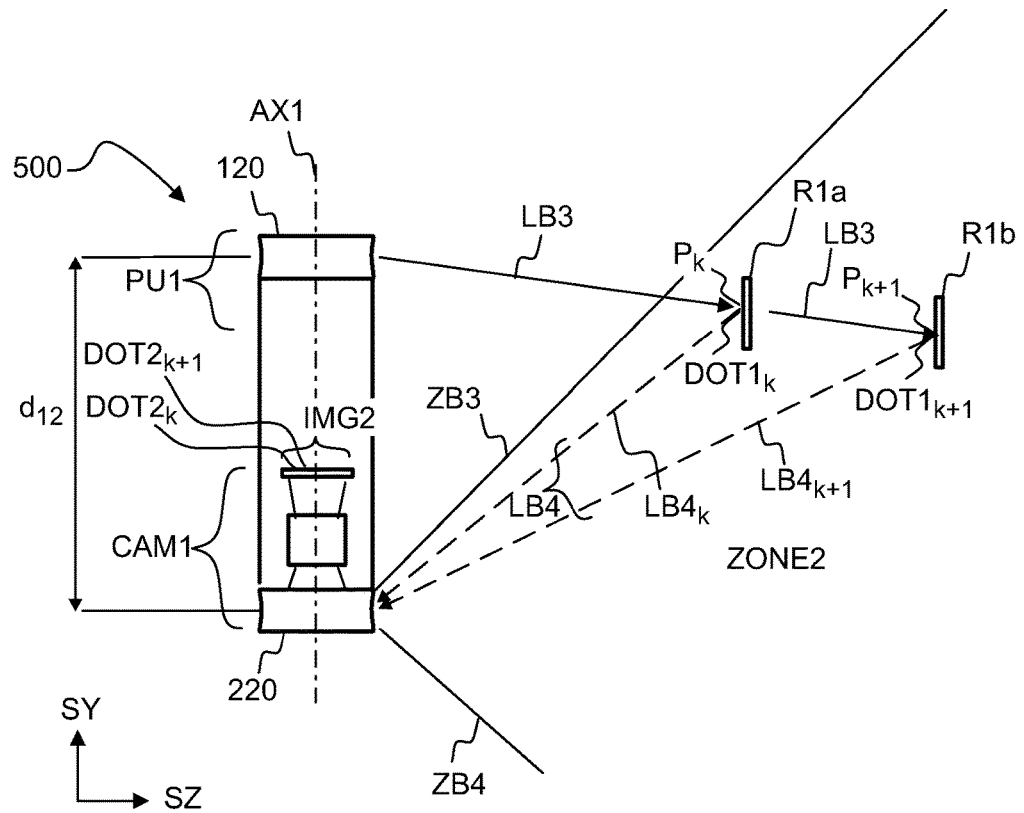
FIG. 6a shows, by way of example, in a side view, a first surface portion located at a first distance from the monitoring device, and a second surface portion located at a second different distance from the monitoring device.

Referring to FIG. 6a, surface portions R1a, R1b may be at different distances $L_k$, $L_{k+1}$ from the monitoring device 500. The monitoring device 500 may project a first marker feature $DOT1_k$ on a first surface portion (e.g. R1a). The monitoring device 500 may project a second marker feature $DOT1_{k+1}$ on a second surface portion (e.g. R1b). Reflected light may propagate from the first marker feature $DOT1_k$ to the camera CAM1 as a first light beam $LB4_k$. Reflected light may propagate from the second marker feature $DOT1_{k+1}$ to the camera CAM1 as a second light beam $LB4_{k+1}$. The camera CAM1 may form an annular image IMG2 of the viewing zone ZONE2. The annular image IMG2 may comprise a first image $DOT2_k$ and a second image $DOT2_{k+1}$. The image $DOT2_k$ may be an image of the first marker feature $DOT1_k$. The image $DOT2_{k+1}$ may be an image of the second marker feature $DOT1_{k+1}$. The elevation angle of the reflected light beam $LB4_k$ may depend on the distance $L_k$ between marker feature $DOT1_k$ and the camera CAM1. Consequently, the radial position $r_k$ of the image $DOT2_k$ of the marker feature $DOT1_k$ may depend on the distance $L_k$ between marker feature $DOT1_k$ and the camera CAM1. Consequently, the distance $L_k$ may be determined from the radial position $r_k$ of the image of the marker feature $DOT1_k$.

The surface portions R1a, R1b may reflect light towards the camera CAM1 e.g. by diffuse reflection. The diffuse reflection may be called as the scattering.

Figure 6B:
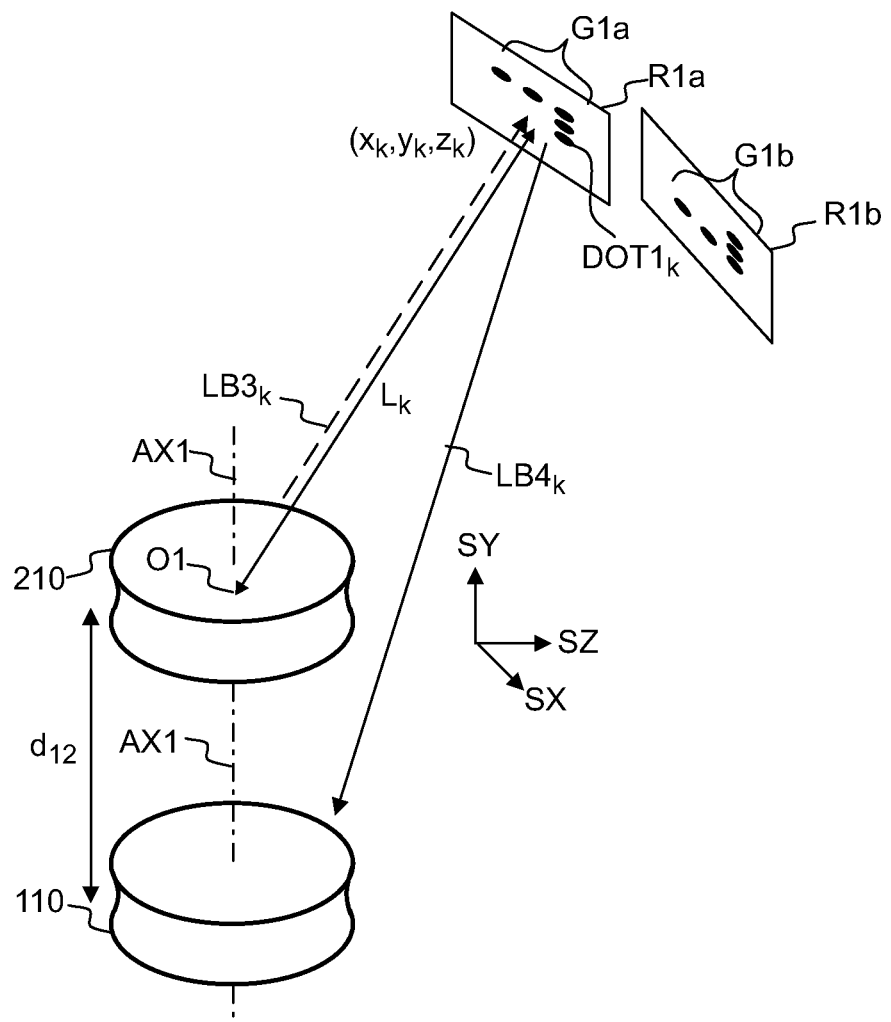
FIG. 6b shows, by way of example, in a three dimensional view, a first surface portion located at a first distance from the monitoring device, and a second surface portion located at a second different distance from the monitoring device.

Referring to FIG. 6b, a plurality of surface portions R1a, R1b may be simultaneously located in the monitoring zone ZONE4 of the device 500. A sub-pattern G1a may be projected on the surface portion R1a. A sub-pattern $\theta_1$ b may be projected on the surface portion R1b. The dimension $L_k$ denotes the distance between the origin O1 and a first surface portion (e.g. the portion R1a). The dimension $L_{k+1}$ denotes the distance between the origin O1 and a second surface portion (e.g. the portion R1b). The origin O1 may be e.g. at the center of the output element 120.

Figure 7A:
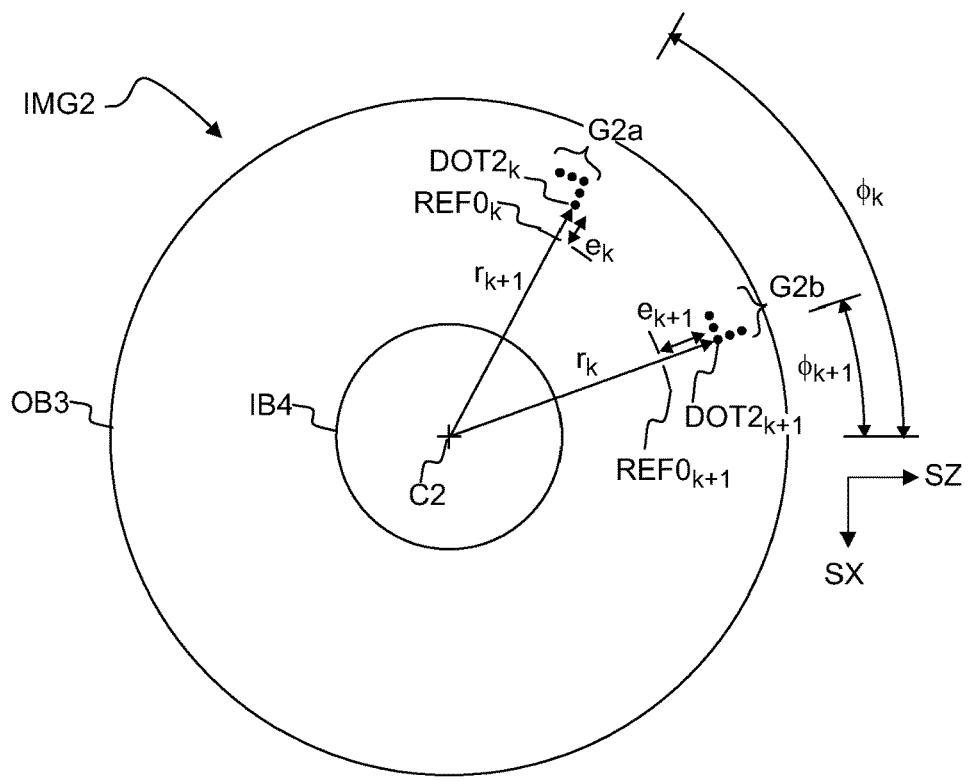
FIG. 7a shows, by way of example, in a top view, an annular image formed on the image sensor of the monitoring device.

Referring to FIG. 7a, the camera CAM1 may form an annular optical image IMG on the image sensor DET1. The image IMG2 may comprise sub-images $\theta_2$a, $\theta_2$b, The sub-image $\theta_2$a may be an image of the sub-pattern G1a. The sub-image $\theta_2$b may be an image of the sub-pattern G1b. The camera CAM1 may provide images DOT2 of the marker features DOT1. Each sub-image $\theta_2$a, $\theta_2$b may be displaced such that the radial displacement may depend on the distance between the origin O1 and the corresponding surface portion R1a, R1b. Each sub-image G2a, G2b may comprise images DOT2 of the marker features DOT1.

The projector PU1 may project e.g. a first sub-pattern G1a e.g. on a first surface portion R1a, and the projector PU1 may project e.g. a second sub-pattern G1b e.g. on a second surface portion R1b. The first sub-pattern $\theta_1$ a may comprise a first marker feature $DOT1_k$, and the second sub-pattern G1b may comprise a second marker feature $DOT1_{k+1}$. The annular image IMG2 may comprise an image G2a of the first sub-pattern G1a, and an image G2b of the second sub-pattern G1b. The annular image IMG2 may comprise an image $DOT2_k$ of the first marker feature $DOT1_k$, and an image $DOT2_{k+1}$ of the second marker feature $DOT1_{k+1}$. The images G2a, G2b, $DOT2_k$, $DOT2_{k+1}$ are portions of the image IMG2, and they may also be called e.g. as sub-images G2a, G2b, $DOT2_k$, $DOT2_{k+1}$. The annular image IMG2 may have a center C2. The symmetry axis AX1 may pass through the center C2. The dimension $r_k$ may denote the radial distance between the center C2 and the sub-image $DOT2_k$. The dimension $r_{k+1}$ may denote the radial distance between the center C2 and the sub-image $DOT2_{k+1}$. The distance $d_{12}$ between the projector PU1 and the camera may be greater than zero such that the radial distance $r_k$ may depend on the distance $L_k$ between the projector PU1 and the surface portion R1a. The radial distance $r_{k+1}$ may depend on the distance $L_{k+1}$ between the projector PU1 and the surface portion R1b. Consequently, the monitoring device 500 may be configured to determine the distance $L_k$ from the radial distance $r_k$. The monitoring device 500 may be configured to determine the distance $L_{k+1}$ from the radial distance $r_{k+1}$. The monitoring device 500 may be configured to determine one or more distances $L_k$, $L_{k+1}$ by analyzing the captured image IMG2.

The dimension $e_k$ may denote the radial displacement between the sub-image $DOT2_k$ and a first reference position $REF0_k$. The dimension $e_{k+1}$ may denote the radial displacement between the sub-image $DOT2_{k+1}$ and a second reference position $REF0_{k+1}$. The radial displacement $e_k$ may depend on the distance $L_k$ between the projector PU1 and the surface portion R1a. The radial displacement $e_{k+1}$ may depend on the distance $L_{k+1}$ between the projector PU1 and the surface portion R1b. Consequently, the monitoring device 500 may be configured to determine the distance $L_k$ based on the radial displacement $e_k$. The monitoring device 500 may be configured to determine the distance $L_k$ from the radial displacement $e_k$. The monitoring device 500 may be configured to determine the distance $L_{k+1}$ from the radial displacement $e_{k+1}$.

The marker pattern PAT1 may comprise a plurality of locally unique sub-patterns G1a, G1b, G1c so as to allow identification based on the shapes of the sub-patterns. Each sub-image G2a, G2b may have its own reference position for determining the displacement. The reference position for the displacement of a sub-image may be determined by identifying said sub-image. The sub-image may be identified by image recognition. Each sub-image may have locally unique shape, and said sub-image may be identified by image recognition. Each sub-image may be identified by comparing the image IMG2 with a reference image $IMG2_{REF}$.

The sub-pattern G1a may be identified e.g. by image recognition from the sub-image G2a of said sub-pattern G1a. The sub-pattern G1b may be identified e.g. by image recognition from the sub-image G2b of said sub-pattern G1b. The first reference position $REF0_k$ for the displacement $e_k$ of the sub-image $DOT2_k$ of the first marker feature $DOT1_k$ may be determined e.g. based on the identity of the sub-pattern G1b. The reference position $REF0_k$ may be retrieved e.g. from a reference image $IMG2_{REF}$ or from a lookup table by using the identity of the sub-pattern G1b. The first reference position $REF0_k$ for the displacement $e_k$ of the sub-image $DOT2_k$ of the first marker feature $DOT1_k$ may be retrieved from a memory by using the identity of the sub-pattern G1b. The monitoring device 500 may be configured to determine the distance $L_k$ from the radial displacement $e_k$. The monitoring device 500 may be configured to determine the distance $L_{k+1}$ from the radial displacement $e_{k+1}$.

The azimuth angle $\phi_k$ of the first marker feature $DOT1_k$ may be determined e.g. based on the identity of the sub-pattern G1a and/or by determining the azimuth angle $\phi_k$ of the sub-image $DOT2_k$ of said marker feature $DOT1_k$. The elevation angle $\theta_k$ of the first marker feature $DOT1_k$ may be determined e.g. based on the identity of the sub-pattern $\theta_1$ a. The azimuth angle $\phi_{k+1}$ of the second marker feature $DOT1_{k+1}$ may be determined e.g. based on the identity of the sub-pattern G1b and/or by determining the azimuth angle $\phi_{k+1}$ of the sub-image $DOT2_{k+1}$ of said marker feature $DOT1_{k+1}$. The elevation angle $\theta_{k+1}$ of the second marker feature $DOT1_{k+1}$ may be determined e.g. based on the identity of the sub-pattern $\theta_1$ b.

Consequently, the monitoring device 500 may determine the spherical coordinates ($\phi_k$, $\theta_k$, $L_k$), which specify the position $P_k$ of the first marker feature $DOT1_k$ on the surface portion R1a. The monitoring device 500 may determine the spherical coordinates ($\phi_{k+1}$, $\theta_{k+1}$, $L_{k+1}$), which specify the position $P_{k+1}$ of the second marker feature $DOT1_{k+1}$ on the different surface portion R1b. If needed, the spherical coordinates ($\phi_k$, $\theta_k$, $L_k$) may be converted into Cartesian coordinates ($x_k$, $y_k$, $z_k$) by data processing.

The reference position REF0 associated with a given sub-pattern may be initially determined experimentally or by simulation. For example, the camera CAM1 may capture a calibration image $IMG2_{REF}$ in a situation where the sub-pattern G1b is projected on a projection screen SRF0, which is at a known distance from the projector PU1. The calibration image $IMG2_{REF}$ may comprise a sub-image G2b of said sub-pattern G1b. The position of the sub-image G2b may directly indicate the reference position REF0 associated with the sub-pattern $\theta_1$ b. The calibration image $IMG2_{REF}$ may also be called e.g. as the reference image. Said known distance may be equal to e.g. 1 m, 5 m, or 10 m. An example of a calibration image $IMG2_{REF}$ is shown e.g. in FIG. 8b.

The reference position $REF0_k$ associated with a given marker feature $DOT1_k$ may be initially determined experimentally or by simulation. For example, the camera CAM1 may capture a reference image $IMG2_{REF}$ in a situation where the marker feature $DOT1_k$ is projected on a projection screen SRF0, which is at a known distance from the projector PU1. The reference image $IMG2_{REF}$ may comprise a sub-image $DOT2_k$ of the marker feature $DOT1_k$. The position of the sub-image $DOT2_k$ may indicate the reference position $REF0_k$ associated with the marker feature $DOT1_k$.

Figure 7B:
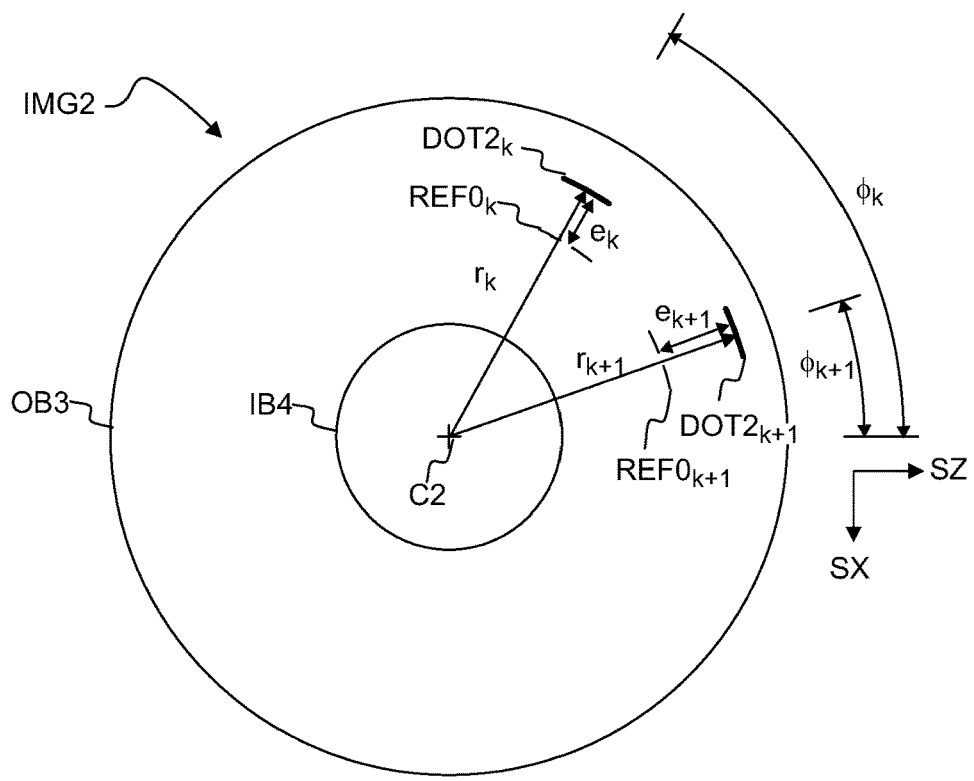
FIG. 7b shows, by way of example, in a top view, an annular image formed on the image sensor of the monitoring device.

Referring to FIG. 7b, the marker features $DOT1_k$, $DOT1_{k+1}$ may be e.g. line sections. The annular image IMG2 may comprise images $DOT_k$, $DOT2_{k+1}$ of the marker features $DOT1_k$, $DOT1_{k+1}$.

The monitoring device 500 may be configured to determine one or more distances $L_k$, $L_{k+1}$ by analyzing the captured image IMG2. The monitoring device 500 may be configured to determine the distance $L_k$ from the radial displacement $e_k$. The monitoring device 500 may be configured to determine the distance $L_{k+1}$ from the radial displacement $e_{k+1}$. In an embodiment, the projector PU1 may project a sparse stripe pattern PAT1 to the projection zone ZONE1. The angular separation between adjacent horizontal lines of the pattern PAT1 may be so large that the identity of each marker feature $DOT1_{k+1}$ may be determined based on the position $r_k$ of the sub-image $DOT2_k$ of said marker feature $DOT1_{k+1}$.

In an embodiment, the projector PU1 may project a single horizontal line to the projection zone ZONE1 such that there is no need to determine the identity of the line sections formed on the surface portions R1a, R1b. The projector PU1 be arranged to change the elevation angle of the projected line. The projected line may sweep from the first boundary SB1 to the second boundary ZB2 through the projection zone ZONE1.

The image IMG2 may be an image of the viewing zone ZONE2. The annular image IMG2 may have an inner boundary IB4 and an outer boundary OB3. The viewing zone ZONE2 may have a first boundary ZB3 and a second boundary ZB4 (see e.g. FIG. 1). The outer boundary OB3 may be an image of the first boundary ZB3. The inner boundary IB4 may be an image of the second boundary ZB4. Alternatively, the outer boundary OB3 may be an image of the boundary ZB3, and the inner boundary IB4 may be an image of the boundary ZB4.

Figure 8A:
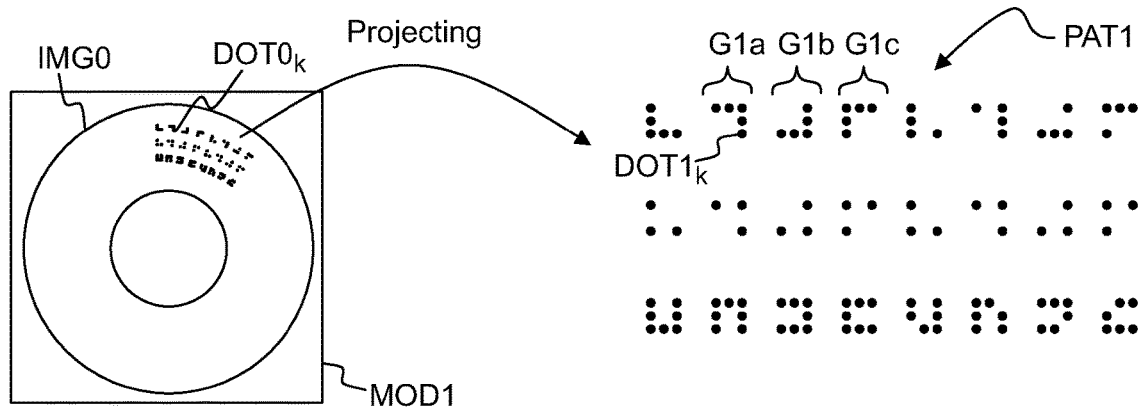
FIG. 8a shows, by way of example, a marker pattern, which corresponds to a primary image.

Referring to FIG. 8a, the spatial modulator MOD1 may provide a primary image IMG0. The primary image IMG0 may be a circular or annular image. The primary image IMG0 may comprise a plurality of primary features DOT0.

The projector PU1 may project the marker pattern PAT1 to the projecting zone ZONE1. The projected marker pattern PAT1 may be an image of the primary image IMG0. The marker pattern PAT1 may comprise a plurality of marker features $DOT1_k$, $DOT1_{k+1}$, . . . . For example, the marker feature $DOT1_k$ may be an image of a primary feature $DOT0_k$.

The marker pattern PAT1 may optionally comprise a plurality of sub-patterns G1a, G1b, G1c . . . . Each sub-pattern G1a, G1b, G1c may comprise one or more marker features $DOT1_k$, $DOT1_{k+1}$, . . . .

An object OBJ1 may be located at a random or arbitrary position. The identity of a sub-pattern formed on the surface of said object OBJ1 may depend on the position of said object OBJ1. The entire marker pattern PAT1 could be formed e.g. on a cylindrical projection surface SRF0, in a situation where projector PU1 would be completely surrounded by the projection surface SRF0, and the light LB3 provided by the projector PU1 would impinge on the cylindrical projection surface SRF0. In practice, the one or more objects OBJ1 located in the environment ENV1 of the monitoring device 500 may cover substantially less than 100% of the full solid angle of the projecting zone ZONE1. The camera CAM1 may detect one or more portions of the marker pattern PAT1, depending on the positions of the objects.

Figure 8B:
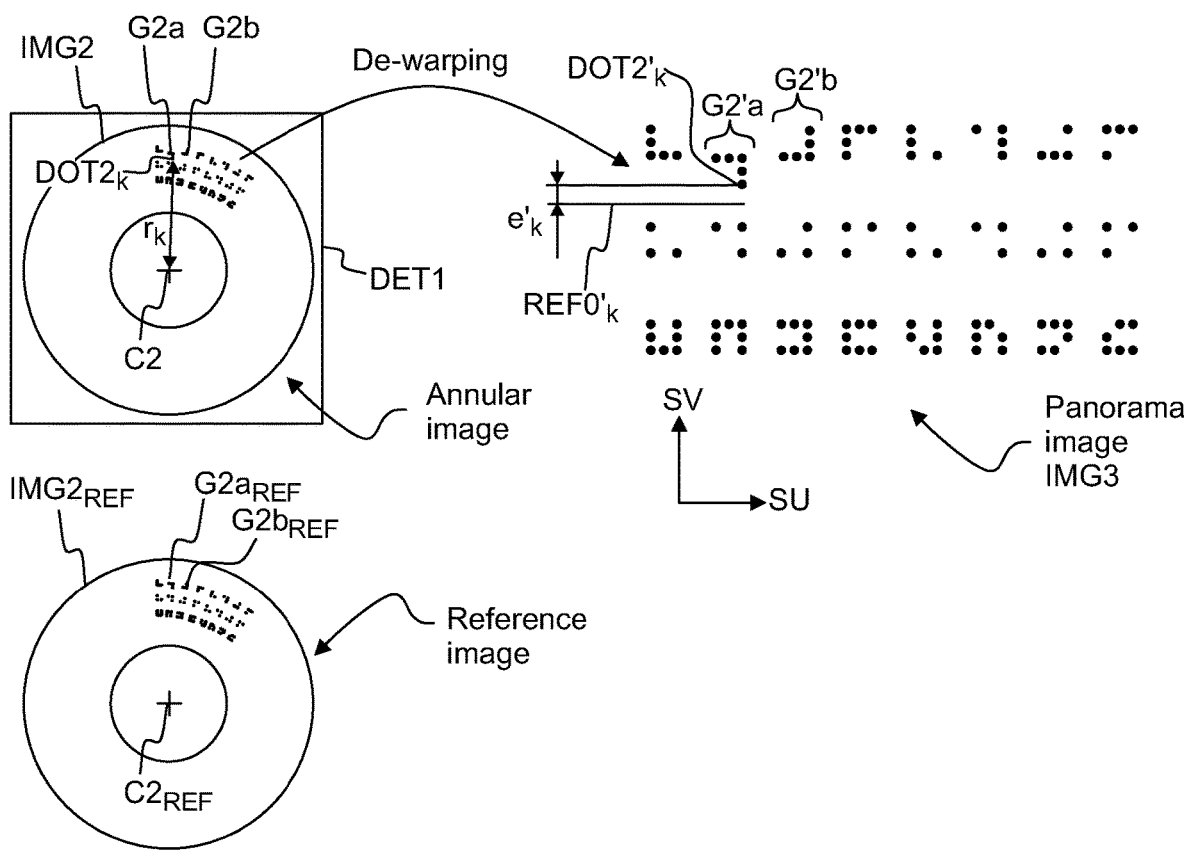
FIG. 8b shows, by way of example, providing a panorama image from a captured annular image.

FIG. 8b shows, by way of example, an annular image IMG2 captured by using the camera CAM1, a panorama image IMG3 formed from the captured image IMG2, and a reference image $IMG2_{REF}$ for determining the radial displacement $e_k$.

The camera CAM1 may form the annular image IMG2 on the image sensor DET1. The distance $L_k$ of a marker feature $DOT1_k$ may be determined from the radial position $r_k$ of the sub-image $DOT2_k$ of said marker feature $DOT1_k$. The optical annular image IMG2 may be an image of the viewing zone ZONE2. The image sensor DET1 may convert the optical annular image IMG2 into a digital form. The distance to a reflecting surface portion may be determined by comparing the annular optical image IMG2 with a reference image $IMG2_{REF}$. The distance may be determined e.g. from the radial displacement of features DOT2 appearing in the annular image IMG2. The image IMG2 may be converted into a digital image e.g. for performing image analysis operations.

If desired, the annular image IMG2 may be converted into a rectangular panorama image IMG3 by image processing.

The panorama image IMG3 may be formed in a two-dimensional Cartesian space defined by orthogonal directions SU and SV. The panorama image IMG3 may be a digital image. If desired, the panorama image IMG3 may be displayed to user e.g. by using display of a user interface UIF1.

The panorama image may comprise e.g. sub-images G2'a, G2'b. The sub-image G2'a may be an image of the sub-pattern G1a of the marker pattern PAT1. The sub-image G2'a may comprise an image $DOT2'_k$ of the marker feature $DOT1_k$. The image $DOT2'_k$ may be displaced by a vertical distance $e'_k$ with respect to a reference position $REF0'_k$. The distance $L_k$ to the marker feature $DOT1_k$ may be determined e.g. from the magnitude of the vertical displacement $e'_k$. The distance may be determined e.g. from the vertical displacement of features appearing in the panorama image IMG2.

The reference image $IMG2_{REF}$ may comprise a plurality of reference patterns $G2a_{REF}$, $G2b_{REF}$. The sub-patterns may be identified e.g. by comparing the captured image IMG2 with the patterns of the reference image $IMG2_{REF}$. The reference image $IMG2_{REF}$ may also specify a reference position REF0 for each sub-pattern.

Positions of points of the marker pattern PAT1 may be specified e.g. by Cartesian coordinates (x,y,z) or by angular coordinates ($\phi$, $\theta$, L). Positions of points of the image IMG2 may be specified e.g by polar coordinates ($\phi$, r). $\phi$ may denote an azimuth angle of an image point. The dimension r may denote a radial distance between an image point and the center C2 of the annular image IMG2. Positions of points of the image IMG3 may be specified e.g. by Cartesian coordinates (u,v).

Figure 9A:
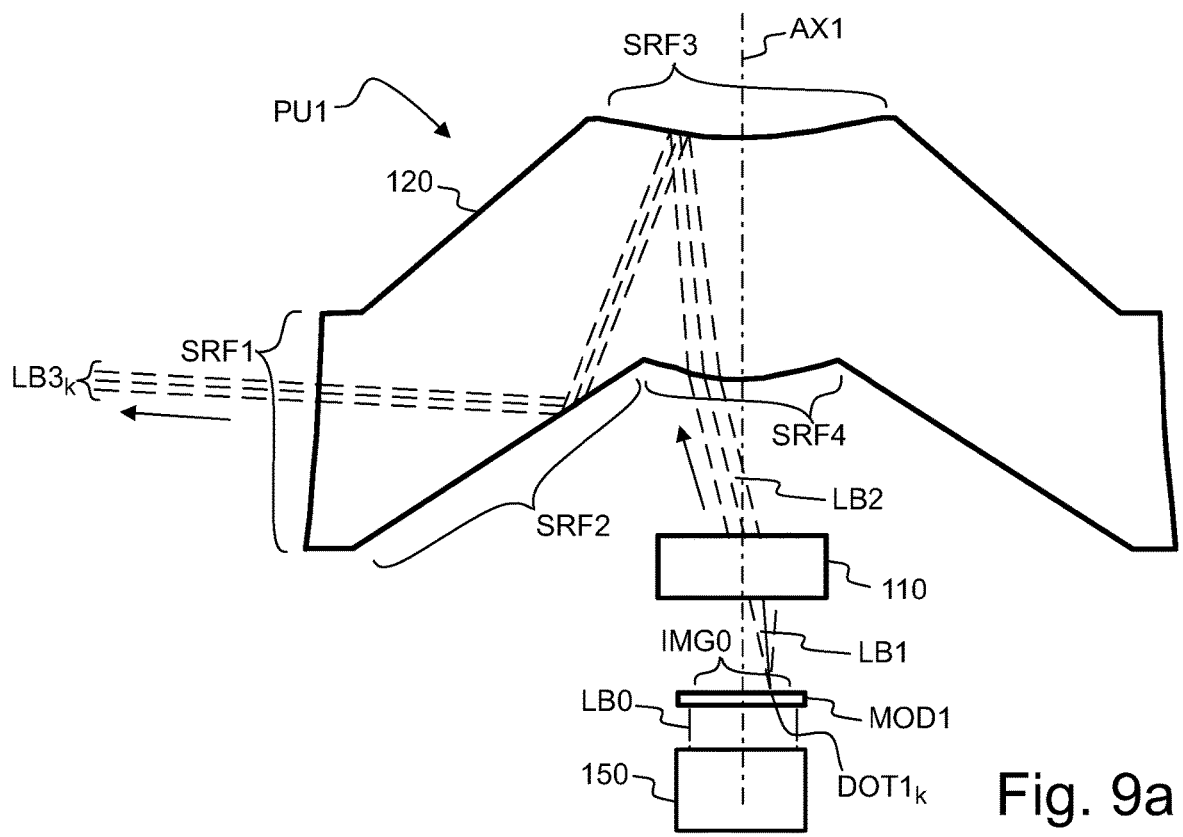
FIG. 9a shows, by way of example, in a cross-sectional side view, optical units of a projector of the position monitoring device.

Referring to FIG. 9a, the projecting unit PU1 may comprise an illuminating unit 150, a modulator MOD1, focusing optics 110, and an output element 120. The modulator MOD1 may be e.g. a digital micromirror device, and LCOS device or a stationary modulator (e.g. a diaprojector slide). LCoS means Liquid Crystal on Silicon. The illuminating unit 150 may be arranged to provide illuminating light B0 to the modulator MOD1. The modulator MOD1 may provide a reference pattern IMG0. The focusing optics 110 may provide a substantially focused beam B2 by focusing light B1 of the modulator MOD1. The output element 120 may project light B3 to the projection zone ZONE1 by deflecting light of the beam B2. The output element 120 may be e.g. a catadioptric lens, which comprises a refracting input surface SRF4, a first reflecting surface SRF3, a second reflecting surface SRF2, and a refracting output surface SRF1. The surfaces SRF1, SRF2, SRF3, and/or SRF4 may be axially symmetric with respect to the axis AX1. The optics 110 may be axially symmetric with respect to the axis AX1.

Figure 9B:
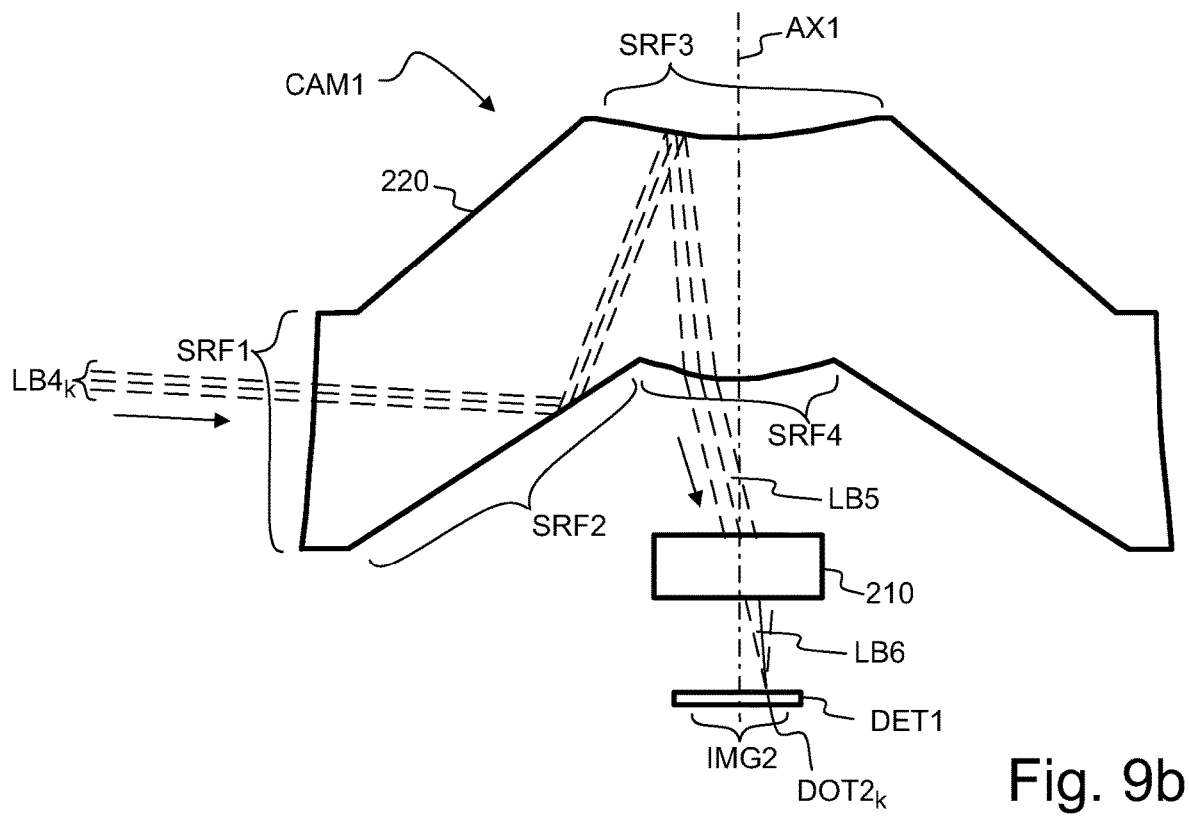
FIG. 9b shows, by way of example, in a cross-sectional side view, optical units of a camera of the position monitoring device.

Referring to FIG. 9b, the camera CAM1 may comprise an input element 220, focusing optics 210, and an image sensor DET1. The image sensor DET1 may be e.g. a CCD sensor or a CMOS sensor. CCD means charge coupled device. CMOS means Complementary Metal Oxide Semiconductor. The input element 220, and the focusing optics 210 may form an image of the viewing zone ZONE2 on the image sensor DET1. The input element 220 may provide a deflected beam B5 to the focusing optics 210 by deflecting light B4 received from the viewing zone ZONE2. The focusing unit 210 may form an annular image IMG2 of the viewing zone ZONE2 on the image sensor DET1.

The input element 220 may be e.g. a catadioptric lens, which comprises a refracting input surface SRF1, a first reflecting surface SRF2, a second reflecting surface SRF3, and a refracting output surface SRF4. The surfaces SRF1, SRF2, SRF3, and/or SRF4 may be axially symmetric with respect to the axis AX1. The optics 210 may be axially symmetric with respect to the axis AX1.

The catadioptric lenses 120, 220 may also be called as omnidirectional lenses.

Figure 10:
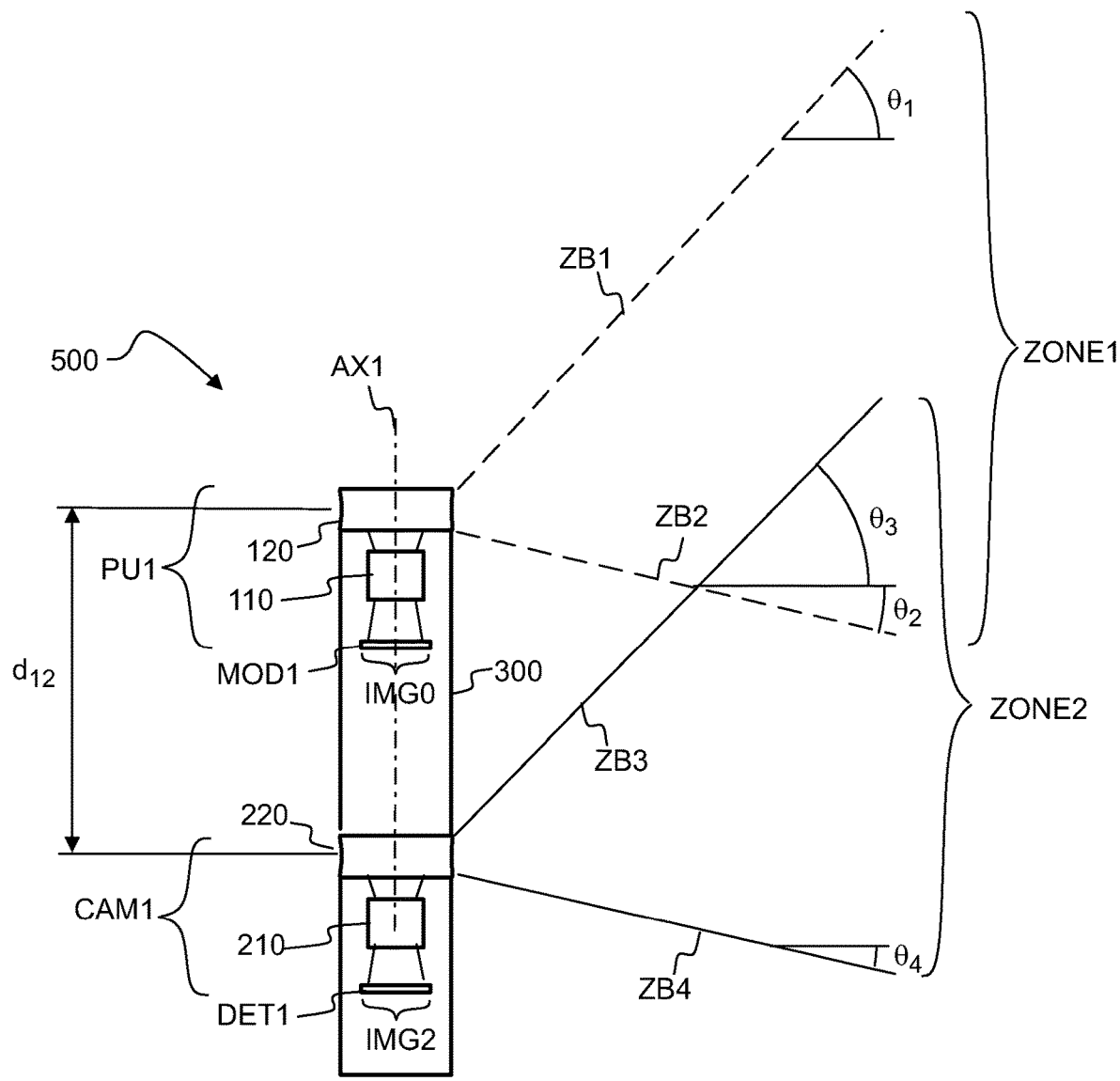
FIG. 10 shows, by way of example, in a side view, matching the viewing zone with the projecting zone.

Referring to FIG. 10, the angle $\theta_1$ of the upper boundary ZB1 of the projecting zone ZONE1 may be substantially equal to the angle $\theta_3$ of the upper boundary ZB3 of the viewing zone ZONE3. The angle $\theta_2$ of the lower boundary ZB2 of the projecting zone ZONE1 may be substantially equal to the angle $\theta_4$ of the lower boundary ZB4 of the viewing zone ZONE3. The angle $\theta_1$ may be substantially different from the angle $-\theta_3$, i.e. the projecting zone does not need to be symmetric with respect to the horizontal plane.

The use of catadioptric lenses 120, 220 may allow matching the angles $\theta_1$, $\theta_2$ of the viewing zone ZONE3 with the angles $\theta_3$, $\theta_4$ of the projecting zone ZONE1. When using the catadioptric lens 220, the camera CAM1 may have the full 360° view around the lens 220 also in a situation where the projector PU1 is stacked on top of the camera CAM1.

Figure 11:
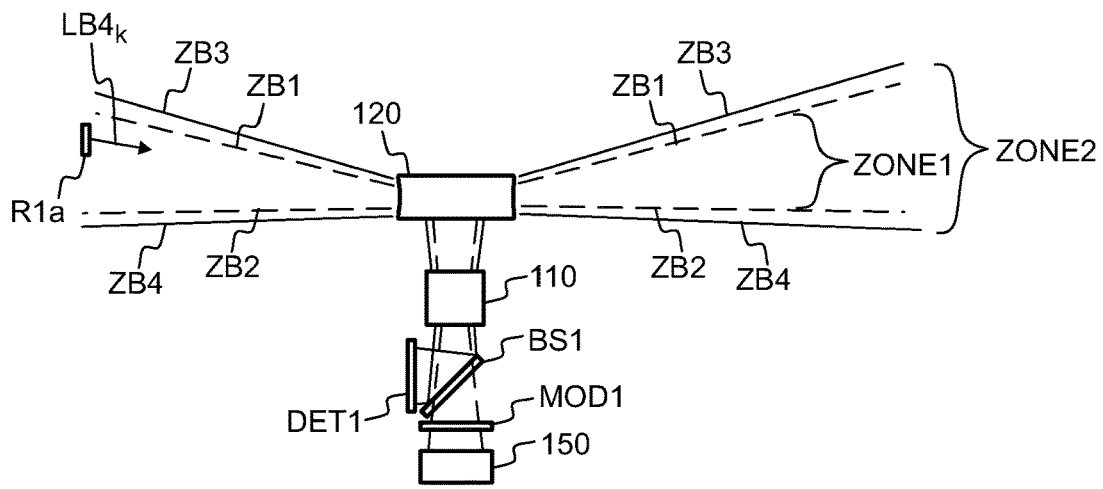
FIG. 11 shows, by way of example, in a side view, a monitoring device, which uses the same optical element to project light and to receive light.

Referring to FIG. 11, the projector PU1 and the camera CAM1 may have one or more common optical components. The projector PU1 may have an optical output element 120 to project the marker pattern PAT1, the camera CAM1 may have an optical input element 220 to receive light $LB4_k$ from the viewing zone ZONE2, wherein the output element 120 of the projector PU1 may also operate as the input element 220 of the camera CAM1. In particular, the output unit 120 of the projector PU1 may also operate as the input unit 220 of the camera CAM1. The distance $d_{12}$ between the output unit 120 and the input unit 220 may be equal to zero.

The device 500 may comprise e.g. a beam splitter BS1 to optically couple the modulator MOD1 and the image sensor SEN1 to the same unit 120.

The marker features of the marker pattern PAT1 may be substantially sharply focused. The projector PU and/or the camera CAM1 may be designed to minimize optical aberrations.

Figures 12A, 12B, 12C:
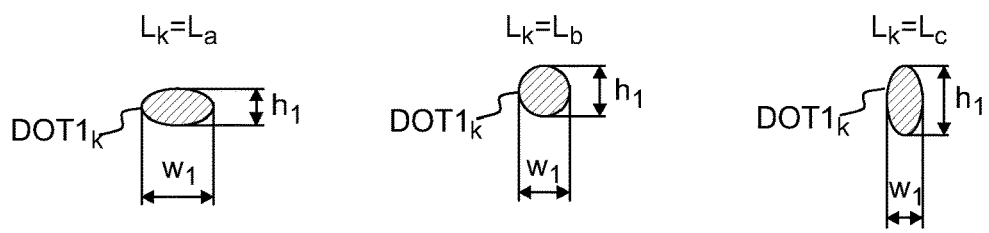
FIGS. 12a to 12c show, by way of example, the shapes of projected dots formed at different distances from the monitoring device.
Figure 13:
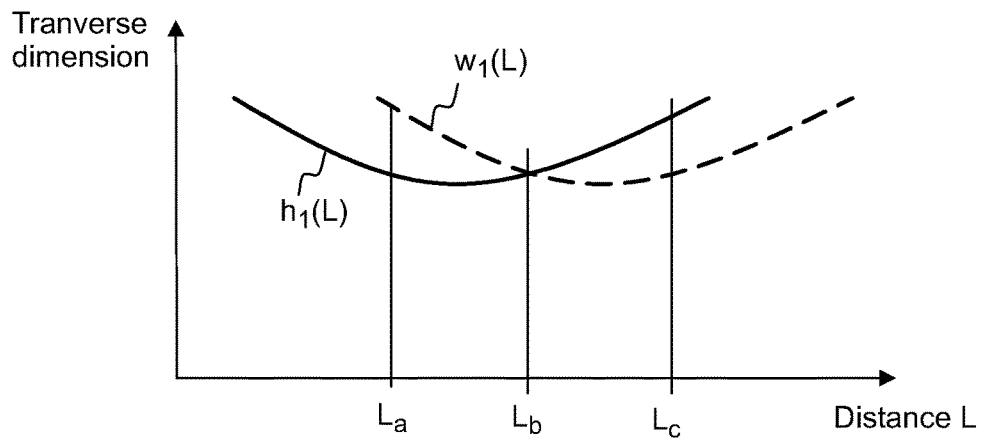
FIG. 13 shows, by way of example, the height and the width of the projected dots as the function of the distance from the monitoring device.

Alternatively, the device 500 may be arranged to deform the shape of the marker features and/or the images of the marker features. Referring to FIGS. 12a to 12c the projector PU1 and/or the camera CAM1 may cause aberrations, which depend on the distance L between the device 500 and a reflecting surface portion (e.g. the portion R1a). In particular, the projector PU and/or the camera CAM1 may have astigmatism. The projector PU1 may form the marker pattern PAT1 such that the marker pattern PAT1 is an image of the primary image IMG0. The projector PU1 may be arranged to deform a feature DOT1 of a sub-pattern G1a such that the shape of said feature depends on the distance L between the device 500 and a reflecting surface portion (e.g. the portion R1a). The camera CAM1 may form an annular image IMG2 on the image sensor DET1. The annular image IMG2 may comprise an image DOT2 of a feature DOT1. The camera CAM1 may be arranged to deform a sub-image DOT2 of a feature DOT1 such that the shape of the sub-image DOT2 of depends on the distance L between the device 500 and a reflecting surface portion (e.g. the portion R1a). The distance L to the surface portion R1a may be determined based on a deformed shape of the image DOT2 appearing in the annular image IMG2. FIG. 13 shows, by way of example, the width $w_1(L)$ of a projected dot $DOT1_k$ as the function of the distance L between the projection surface and the projector PU1. FIG. 13 also shows, by way of example, the height $h_1(L)$ of the projected dot $DOT1_k$ as the function of the distance L. $L_a$, $L_b$, and $L_c$ may denote three different distances. The aspect ratio $w_1(L)/h_1(L)$ of the projected feature $DOT1_k$ may depend on the distance. The aspect ratio of image $DOT2_k$ of the projected feature $DOT1_k$ may depend on the distance. Consequently, the distance L may be determined from the shape of the image DOT2 of the projected feature DOT1 appearing in the captured image IMG2. The position $L_k$ of the surface portion R1a may be determined based on the aspect ratio of the projected feature $DOT1_k$. The position $L_k$ of the surface portion R1a may be determined based on the aspect ratio of the image $DOT2_k$.

The annular image IMG2 may comprise an image $DOT2_k$ of a marker feature $DOT1_k$. The marker feature $DOT1_k$ may be projected on a surface portion R1a, and the position $L_k$ of the surface portion R1a may be determined based on a deformed shape of the image $DOT2_k$ of the marker feature $DOT1_k$. The position $L_k$ of the surface portion R1a may be determined by analyzing the (deformed) shape of the image $DOT2_k$ of the marker feature $DOT1_k$.

For example, the camera CAM1 may be arranged to deform an image $DOT2_k$ of a marker feature $DOT1_k$ such that the deformation of said image $DOT2_k$ depends on the distance $L_k$ between the camera CAM1 and the surface portion R1a.

Figure 14:
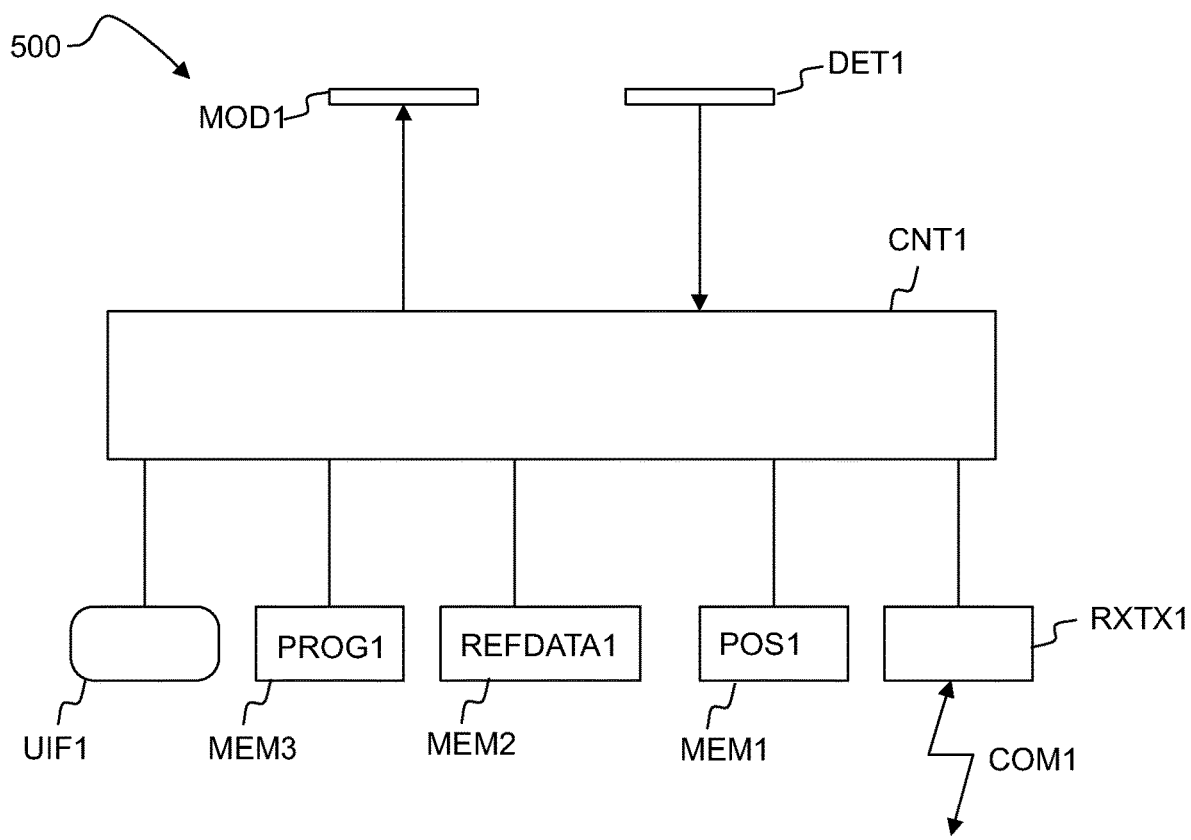
FIG. 14 shows, by way of example, functional units of the position monitoring apparatus.

Referring to FIG. 14, the monitoring device 500 may comprise the image sensor DET1 for capturing the annular image IMG2. The monitoring device 500 may comprise a data processing unit CNT1 for performing data processing operations. The processing unit CNT1 may be configured to determine a distance $L_k$ by analyzing the captured image IMG2.

The device 500 may comprise:
- a projector PU1 to project a marker pattern PAT1 to a projection zone ZONE1 such that a first marker feature $DOT1_k$ of the marker pattern PAT1 is projected on a first surface portion R1a,
- a camera CAM1 to capture an image IMG2 of a viewing zone ZONE2 which at least partly overlaps the projection zone ZONE1, and
- a processing unit CNT1 to determine the position $L_k$ of said first surface portion R1a by analyzing the captured image IMG2, wherein the viewing zone ZONE2 surrounds the camera CAM1, and the camera CAM1 is arranged to capture the image IMG2 of the viewing zone ZONE2 by forming an annular image IMG2 of the viewing zone ZONE2 on an image sensor DET1.

The monitoring device 500 may comprise a modulator MOD1 for providing the primary image IMG0. The modulator MOD1 may be a stationary modulator or a controllable modulator. The processing unit CNT1 may be arranged to change the primary image IMG0 by sending a signal to the modulator MOD1.

The monitoring device 500 may comprise a memory MEM1 for storing determined position data POS1. The position data POS1 may comprise e.g. the coordinates ($\phi_k$, $\theta_k$, $L_k$) of one or more surface portions. The monitoring device 500 may provide position information POS1.

The monitoring device 500 may comprise a memory MEM2 for storing reference data REFDATA1. The reference data REFDATA1 may comprise e.g. a lookup table for retrieving reference positions REF0. The reference data REFDATA1 may comprise e.g. a reference image $IMG2_{REF}$ for performing image recognition.

The monitoring device 500 may comprise a memory MEM3 for storing computer program PROG1. The computer program PROG1 may comprise computer program code configured to, when executed on at least one processor CNT1, cause the device 500 to measure the positions of the objects OBJ1 around the device 500.

The monitoring device 500 may comprise a communication unit RXTX1 to send measured position data POS1. The monitoring device 500 may send the position data POS1 e.g. to a control unit of an industrial system. The monitoring device 500 may send the position data POS1 e.g. to a surveillance system. The monitoring device 500 may send the position data POS1 e.g. to a control system of a vehicle 1000. COM1 denotes a communication signal. The communication unit RXTX1 may be arranged to send the data e.g. by wireless communication, by an electrical cable, or by an optical cable. The communication unit RXTX1 may be arranged to send the data to the Internet and/or to a mobile communications network.

The monitoring device 500 may optionally comprise e.g. a user interface UIF1. The user interface UIF1 may comprise e.g. a display for displaying information to a user. The user interface UIF1 may be arranged to display e.g. the panorama image IMG3.

The projected light LB3 may be in the visible region or in the infrared region. In case of infrared region, the marker pattern PAT1 may be invisible to human eyes.

The monitoring device 500 may be used e.g. as a part of a user interface for a computer game. An industrial machine vision system may comprise the monitoring device 500 for monitoring positions of objects. The monitoring device 500 may be arranged to provide information about the presence of objects e.g. for controlling lighting. The monitoring device 500 may be arranged to provide information about the movements of objects e.g. for controlling lighting. The monitoring device 500 may be arranged to provide information about the presence of objects e.g. for stopping operation of an industrial robot. The monitoring device 500 may be arranged to provide information for a surveillance and/or security system. The monitoring device 500 may be arranged to provide information about the presence of objects e.g. for initiating an alarm. The monitoring device 500 may be arranged to provide information about the movements of objects e.g. for initiating an alarm.

Various embodiments may be illustrated by the following examples.

Example 1

A method, comprising:
using a projector (PU1) to project a marker pattern (PAT1) to a projection zone (ZONE1) such that a first marker feature ($DOT1_k$) of the marker pattern (PAT1) is projected on a first surface portion (R1a),
using a camera (CAM1) to capture an image (IMG2) of a viewing zone (ZONE2) which at least partly overlaps the projection zone (ZONE1), and
determining the position ($L_k$) of said first surface portion (R1a) by analyzing the captured image (IMG2),
wherein the viewing zone (ZONE2) surrounds the camera (CAM1), and the image (IMG2) of the viewing zone (ZONE2) is captured by forming an annular image of the viewing zone (ZONE2) on an image sensor (DET1).

Example 2

The method of example 1 wherein the projector (PU1) has an optical output element (120), the camera has an optical input element (220), the output element (120) and the input element (220) are located on a first axis (AX1), the distance ($d_{12}$) between the input element (220) and the output element (120) is greater than zero, the projection zone (ZONE1) surrounds the first axis (AX1), and the viewing zone (ZONE2) surrounds the first axis (AX1).

Example 3

The method of example 1 or 2, comprising determining the position ($L_k$) of said first surface portion (R1a) by comparing the captured image (IMG2) with a reference image ($IMG2_{REF}$).

Example 4

The method according to any of the examples 1 to 3, wherein the annular image (IMG2) comprises an image ($DOT2_k$) of a feature ($DOT1_k$) of the first marker feature ($DOT1_k$), a radial displacement ($e_k$) of the image ($DOT2_k$) of said feature ($DOT1_k$) depends on the distance ($L_k$) between the projector (PU1) and the first surface portion (R1a), and the distance ($L_k$) between the projector (PU1) and the first surface portion (R1a) is determined based on said displacement ($e_k$).

Example 5

The method according to any of the examples 1 to 4, wherein the marker pattern (PAT1) comprises a plurality of locally unique sub-patterns (G1a, G1b, G1c) so as to allow identification based on the shapes of the sub-patterns.

Example 6

The method according to any of the examples 1 to 5, wherein the annular image (IMG2) comprises a first sub-image (G2a) of the first sub-pattern (G1a), a radial displacement ($e_k$) of the first sub-image (G2a) depends on the distance ($L_k$) between the projector (PU1) and the first surface portion (R1a), and a reference position ($REF0_k$) for the displacement ($e_k$) is determined by identifying the first sub-image (G2a) by image recognition.

Example 7

The method according to any of the examples 1 to 6, wherein the annular image (IMG2) comprises an image ($DOT2_k$) of a marker feature ($DOT1_k$) and wherein the position ($L_k$) of said first surface portion (R1a) is determined based on a deformed shape of the image ($DOT2_k$) of the marker feature ($DOT1_k$).

Example 8

The method according to any of the examples 1 to 7, wherein the projector (PU1) is arranged to deform a feature ($DOT1_k$) such that the deformation of said feature depends on the distance ($L_k$) between the projector (PU1) and the first surface portion (R1a).

Example 9

The method according to any of the examples 1 to 8, wherein the camera (CAM1) is arranged to deform an image ($DOT2_k$) of a marker feature ($DOT1_k$) such that the deformation of said image ($DOT2_k$) depends on the distance ($L_k$) between the camera (CAM1) and the first surface portion (R1a).

Example 10

The method according to any of the examples 1 to 9 wherein the projector (PU1) has an optical output element (120) to project the marker pattern (PAT1), the camera (CAM1) has an optical input element (220) to receive light (LB4) from the viewing zone (ZONE2), and the output element (120) of the projector (PU1) operates as the input element (220) of the camera (CAM1).

Example 11

A method according to any of the examples 1 to 10, comprising determining the position (x,y) of a vehicle (1000) by determining the position ($\phi_k$, $\theta_k$ $L_k$) of said first surface portion (R1a).

Example 12

A method according to any of the examples 1 to 10, comprising determining the position (x,y) of an object (OBJ1) by determining the position ($\phi_k$, $\theta_k$ $L_k$) of said first surface portion (R1a).

Example 13

A device (500), comprising:
a projector (PU1) to project a marker pattern (PAT1) to a projection zone (ZONE1) such that a first marker feature ($DOT1_k$) of the marker pattern (PAT1) is projected on a first surface portion (R1a),
a camera (CAM1) to capture an image (IMG2) of a viewing zone (ZONE2) which at least partly overlaps the projection zone (ZONE1), and
a processing unit (CNT1) to determine the position ($L_k$) of said first surface portion (R1a) by analyzing the captured image (IMG2),
wherein the viewing zone (ZONE2) surrounds the camera (CAM1), and the camera (CAM1) is arranged to capture the image (IMG2) of the viewing zone (ZONE2) by forming an annular image of the viewing zone (ZONE2) on an image sensor (DET1).

Example 14

A vehicle (1000), comprising the device (500) of claim 13.

For the person skilled in the art, it will be clear that modifications and variations of the devices and the methods according to the present disclosure are perceivable. The figures are schematic. The particular embodiments described above with reference to the accompanying drawings are illustrative only and not meant to limit the scope of the present disclosure, which is defined by the appended claims.

The invention claimed is:
1. A method, comprising:
using a projector to project a marker pattern to a projection zone such that a first marker feature of the marker pattern is projected on a first surface portion,
using a camera to capture an image of a viewing zone which at least partly overlaps the projection zone, and
determining a position of said first surface portion by analyzing the captured image, wherein the viewing zone surrounds the camera, and the captured image is captured by forming an annular image of the viewing zone on an image sensor, wherein the annular Image comprises a first sub-image of a first sub-pattern, a radial displacement of the first sub-image depends on a distance between the projector and the first surface portion, and a reference position for the radial displacement is determined by identifying the first sub-image by image recognition.

2. The method of claim 1 wherein the projector has an optical output element, the camera has an optical input element, the optical output element and the optical input element are located on a first axis, a distance between the optical input element and the optical output element is greater than zero, the projection zone surrounds the first axis, and the viewing zone surrounds the first axis.

3. The method of claim 1, comprising determining the position of said first surface portion by comparing the captured image with a reference image.

4. The method according to claim 1, wherein the annular image comprises an image of a feature of the first marker feature, a radial displacement of the image of said feature depends on the distance between the projector and the first surface portion, and the distance between the projector and the first surface portion is determined based on said radial displacement of the image of said feature.

5. The method according to claim 1, wherein the marker pattern comprises a plurality of locally unique sub-patterns so as to allow identification based on shapes of the plurality of locally unique sub-patterns.

6. The method of claim 1, wherein the annular image comprises an image of a marker feature and wherein the position of said first surface portion is determined based on a deformed shape of the image of the marker feature.

7. The method of claim 6, wherein the projector is arranged to deform a feature such that the deformation of said feature depends on the distance between the projector and the first surface portion.

8. The method of claim 6, wherein the camera is arranged to deform the image of the marker feature such that the deformation of said image of the marker feature depends on a distance between the camera and the first surface portion.

9. The method of claim 1, wherein the annular image comprises an image of a marker feature and wherein the position of said first surface portion is determined based on a deformed shape of the image of the marker feature.

10. The method of claim 9, wherein the projector is arranged to deform a feature such that the deformation of said feature depends on a distance between the projector and the first surface portion.

11. The method of claim 9, wherein the camera is arranged to deform the image of the marker feature such that the deformation of said image of the marker feature depends on a distance between the camera and the first surface portion.

12. The method of claim 9, wherein the projector comprises a catadioptric lens to project light to the projection zone.

13. The method of claim 9, wherein the camera comprises a catadioptric lens to receive light from the viewing zone.

14. The method of claim 9 wherein the projector has an optical output element to project the marker pattern, the camera has an optical input element to receive light from the viewing zone, and the optical output element of the projector operates as the optical input element of the camera.

15. A method according to claim 1, comprising determining a position of a vehicle by determining the position of said first surface portion.

16. A method according to claim 1, comprising determining a position of an object by determining the position of said first surface portion.

17. A device, comprising:
a projector to project a marker pattern to a projection zone such that a first marker feature of the marker pattern is projected on a first surface portion,
a camera to capture an image of a viewing zone which at least partly overlaps the projection zone, and
a processing unit to determine a position of said first surface portion by analyzing the captured image,
wherein the viewing zone surrounds the camera, and the camera is arranged to capture the image of the viewing zone by forming an annular image of the viewing zone on an image sensor, wherein the annular Image comprises a first sub-image of a first sub-pattern, a radial displacement of the first sub-image depends on a distance between the projector and the first surface portion, and a reference position for the radial displacement is determined by identifying the first sub-image by Image recognition.

18. A vehicle, comprising the device of claim 17.

\* \* \* \* \*